United States Patent
Griffin et al.

(10) Patent No.: US 12,074,965 B1
(45) Date of Patent: *Aug. 27, 2024

(54) BLOCKCHAIN ANONYMOUS TOKENIZATION SYSTEM

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 288 days.

This patent is subject to a terminal disclaimer.

(21) Appl. No.: 17/563,902

(22) Filed: Dec. 28, 2021

Related U.S. Application Data

(63) Continuation of application No. 16/415,334, filed on May 17, 2019, now Pat. No. 11,265,148.

(51) Int. Cl.
| | |
|---|---|
| *G06F 21/00* | (2013.01) |
| *G06F 21/64* | (2013.01) |
| *H04L 9/06* | (2006.01) |
| *H04L 9/32* | (2006.01) |
| *H04L 9/00* | (2022.01) |

(52) U.S. Cl.
CPC .......... *H04L 9/0643* (2013.01); *G06F 21/64* (2013.01); *H04L 9/3247* (2013.01); *H04L 9/50* (2022.05); *H04L 2209/42* (2013.01); *H04L 2209/76* (2013.01)

(58) Field of Classification Search
CPC ....... H04L 9/0643; H04L 9/3247; H04L 9/50; H04L 2209/42; H04L 2209/76; H04L 9/3239; H04L 9/3297; G06F 21/64
See application file for complete search history.

(56) References Cited

U.S. PATENT DOCUMENTS

| | | | |
|---|---|---|---|
| 10,025,941 B1 | 7/2018 | Griffin et al. | |
| 2012/0272323 A1* | 10/2012 | Swaminathan | G06F 21/64 726/26 |
| 2016/0019536 A1 | 1/2016 | Ortiz et al. | |
| 2016/0267467 A1 | 9/2016 | Rutherford et al. | |
| 2018/0302382 A1 | 10/2018 | Lehmann et al. | |
| 2019/0164153 A1* | 5/2019 | Agrawal | H04L 9/0637 |
| 2019/0288850 A1* | 9/2019 | Beecham | G06F 21/6209 |

* cited by examiner

*Primary Examiner* — Ghazal B Shehni
(74) *Attorney, Agent, or Firm* — Foley & Lardner LLP

(57) ABSTRACT

Various arrangements relate to a method performed by a processor of a computing system. An example method includes hashing a first salted value to generate a first hashed salted value. The first salted value includes a first salt value and a value. A first tuple is generated. The first tuple includes the first hashed salted value and a first token. The first token is associated with the value. A first BAT message is generated. The first BAT message includes the first salt value. The first BAT message is associated with the first tuple. A second salted value is hashed to generate a second hashed salted value. The second salted value includes a second salt value and a value. A second tuple is generated. The second tuple includes the second hashed salted value and a second token. The second token is associated with the value. A second BAT message is generated.

20 Claims, 5 Drawing Sheets

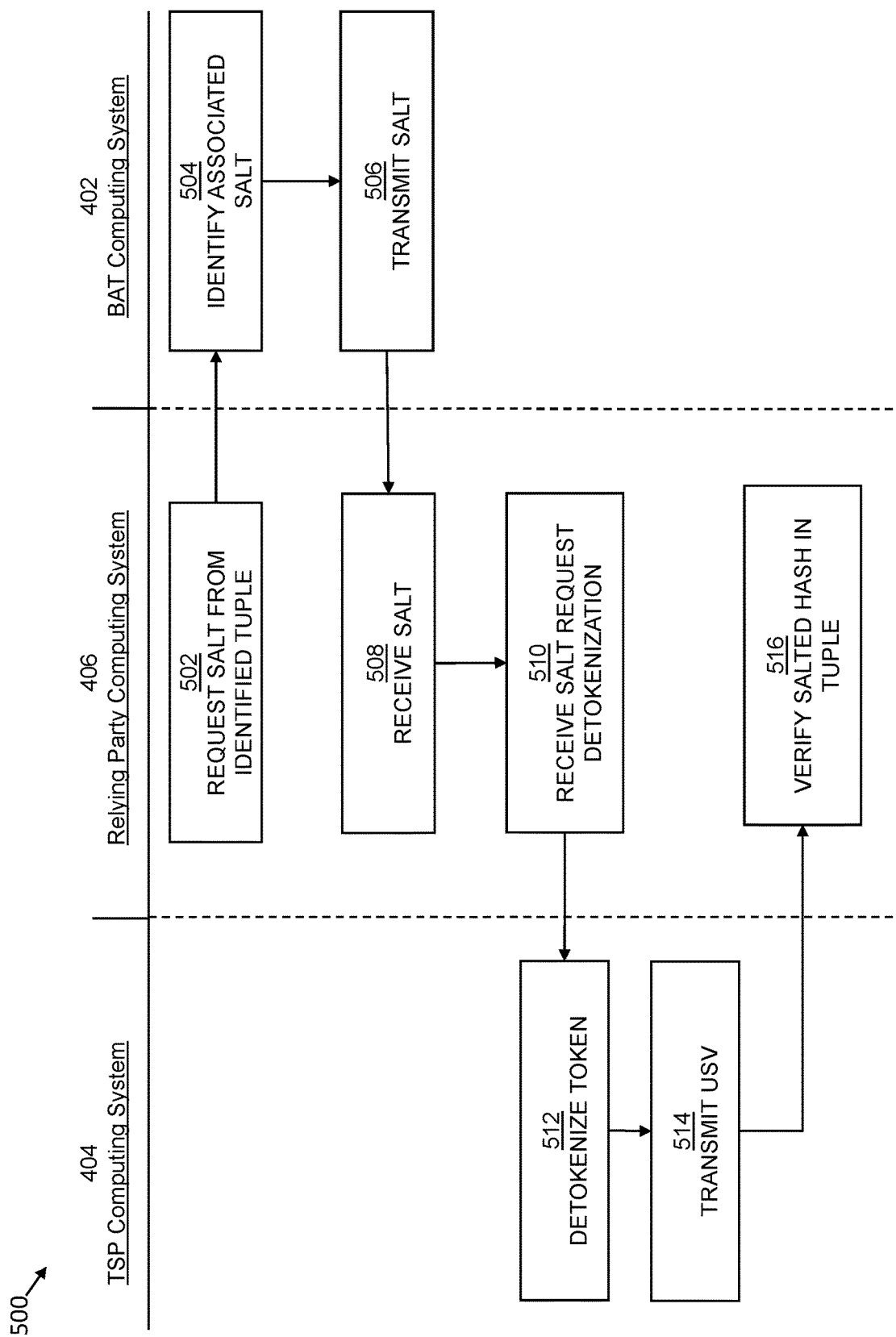

BLOCKCHAIN ANONYMOUS TOKENIZATION SYSTEM

CROSS-REFERENCE TO RELATED APPLICATION AND CLAIM OF PRIORITY

This application is a continuation of U.S. patent application Ser. No. 16/415,334, entitled "Blockchain Anonymous Tokenization System," filed May 17, 2019, which is incorporated herein by reference in its entirety and for all purposes.

BACKGROUND

Tokenization is a process in which a token is substituted as a proxy for data, thus obscuring the underlying data. Accordingly, a token is a surrogate value that can be used to replace some underlying sensitive value. For example, a token may be issued as a proxy for a credit or debit card primary account number ("PAN") such that the token is processed during a transaction instead of the actual PAN, thus protecting the PAN from disclosure during the transaction. The tokens may be generated, stored, and maintained by an entity that specializes in the tokenization process. This entity may be a Tokenization Service Provider ("TSP"), as described in the X9.119-2 standard, which would handle receiving requests to tokenize data and detokenize a token to reveal the corresponding data for an authorized party and/or subscriber of the TSP's services. A token can be made to look very similar to the underlying data for which the token is serving as a proxy such that that no reconfiguration of systems is required (i.e., the token is "format preserving"). In the example where the token serves as a proxy for a PAN, the token may have the same format (e.g., a string of sixteen numbers) such that the token can be accepted by existing payment systems. The mapping of underlying sensitive values to tokens does not have to be one-to-one. As in the example above, different tokens could replace the same PAN in two separate data repositories. A token attribute may share a common value with the original underlying value the token attribute is replacing or be specific to the token itself. For example, the token may share the structure of that value, (i.e., the length and character set) or a mechanism to determine that the token is actually a token (i.e., actually represents a replacement value rather than the original underlying value).

A distributed ledger, such as a blockchain, is a series of signed, hash-linked, append-only, timestamped blocks, each block containing arbitrary data. When viewed as a linked-list data structure, a blockchain is a limited data "stack" whose operations only allow users to "push" blocks onto the top. Users are not allowed to modify blocks or to "pull" blocks from the blockchain. Each new block that is added is appended to the topmost block in the stack. A new block links back to the former top-of-stack block by including a hash (e.g., a smaller mathematical representation) of the preceding block in the new block and binding this hash to the new block.

SUMMARY

Various arrangements relate to a method performed by a processor of a computing system. An example method includes hashing a first salted value to generate a first hashed salted value. The first salted value includes a first salt value and a value. A first tuple is generated. The first tuple includes the first hashed salted value and a first token. The first token is associated with the value. A first BAT message is generated. The first BAT message includes the first salt value. The first BAT message is associated with the first tuple. A second salted value is hashed to generate a second hashed salted value. The second salted value includes a second salt value and a value. A second tuple is generated. The second tuple includes the second hashed salted value and a second token. The second token is associated with the value. A second BAT message is generated. The second BAT message includes the second salt value. The second BAT message is associated with the second tuple.

Various other arrangements relate to a system. The system includes a repository including a plurality of BAT messages and a server system. The server system includes a processor and instructions stored in non-transitory machine-readable media. The instructions are configured to cause the server system to hash a first salted value to generate a first hashed salted value. The first salted value includes a first salt value and a value. A first tuple is generated. The first tuple includes the first hashed salted value and a first token. The first token is associated with the first salted value. A first BAT message is generated. The first BAT message includes the first salt value. The first BAT message is associated with the first tuple. A second salted value is hashed to generate a second hashed salted value. The second salted value includes a second salt value and a value. A second tuple is generated. The second tuple includes the second hashed salted value and a second token. The second token is associated with the second salted value. A second BAT message is generated. The second BAT message includes the second salt value. The second BAT message is associated with the second tuple.

Various arrangements relate to a method performed by a processor of a computing system. An example method includes receiving a first tuple. The first tuple includes a first hashed salted value and a first token. The first hashed salted value is generated by hashing a first salted value. The first salted value is generated by combining a first salt value and a value. The first token is generated by tokenizing the value, wherein the first tuple is associated with a second tuple. The second tuple includes a second hashed salted value and a second token. The second hashed salted value is generated by hashing a second salted value. The second salted value is generated by combining a second salt value and the value and the second token generated by tokenizing the value. A first BAT message associated with the first tuple is identified. The first BAT message includes the first salt value and a value identifier. The value identifier is associated with the value. The value associated with the value identifier is retrieved. The retrieved value and the first salt value of the first BAT message are combined to generate a match salted value. The match salted value is hashed to generate a hashed match salted value. The first hashed salted value of the first tuple is compared to the hashed match salted value to determine authenticity and data integrity of the first tuple.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 5 is a flow diagram of a method of validating a tuple in a blockchain anonymous tokenization system, according to an example arrangement.

Figure 1:
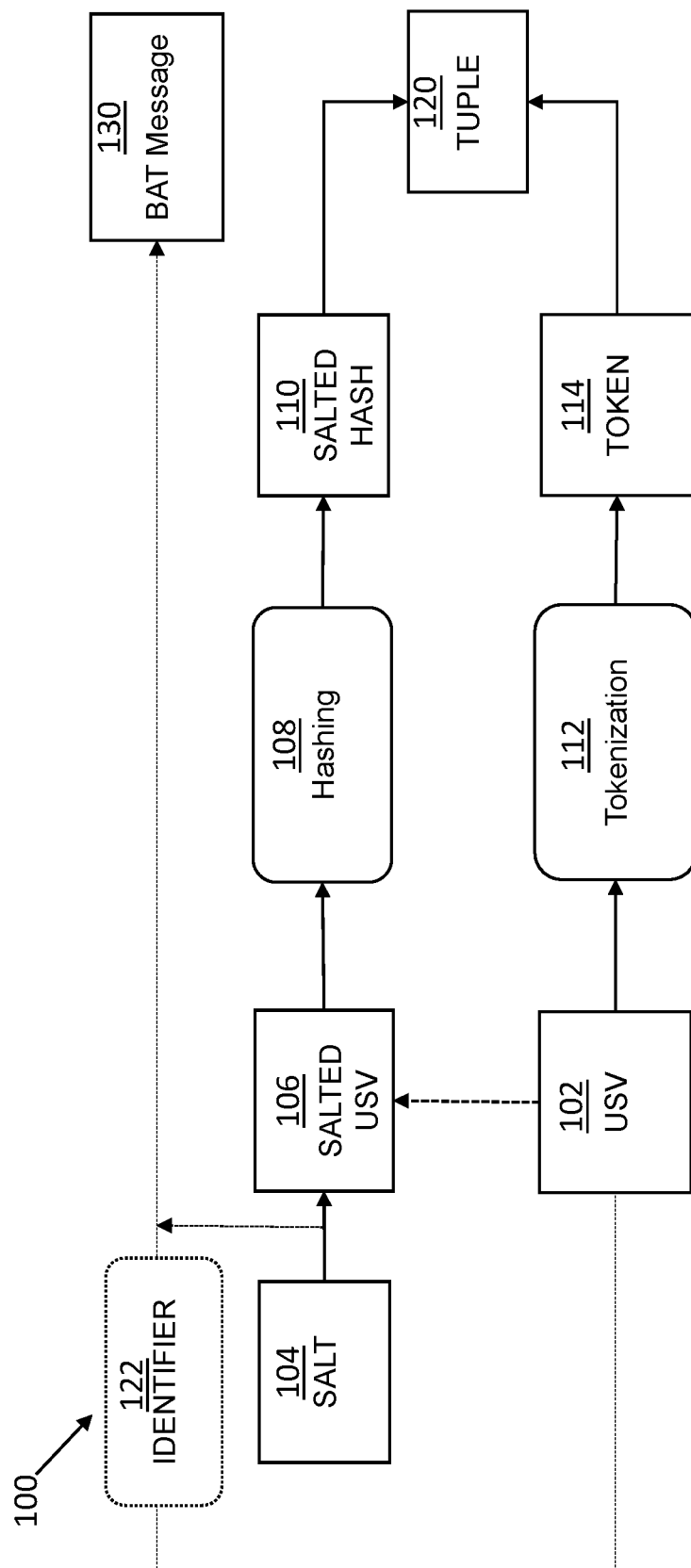
FIG. 1 is a functional block diagram generating a tuple in a blockchain anonymous tokenization system, according to an example arrangement.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

A TSP, or a similar encrypting entity, may be configured to protect underlying sensitive values ("USV") or sensitive data on a blockchain, distributed ledger, or similar electronic data repository, for example, as described in U.S. Pat. No. 10,025,941, entitled "Data Element Tokenization Management," filed on Aug. 23, 2016, and is herein incorporated by reference in its entirety. Under current tokenization systems, a TSP may generate one or more values for a tuple, token, and/or message on the distributed ledger (either through a smart contract, block, etc.) that includes a token, hash of the USV, and a uniform resource identifier ("URI"). The USV may be stored off of the blockchain (e.g., for subsequent retrieval) and protected such that a relying party and/or authorized entity can gain access to the USV (e.g., untokenized, unobscured, etc.) by utilizing the URI in the tuple and, with the requisite access credentials, retrieve the USV from the TSP. While the USV is protected under tokenization, the USV is the same underlying value such that the hash of the USV in the tuple does not change. The hash of the USV is included to provide origin authenticity and non-repudiation for a subsequent relying party, as the token can be detokenized to retrieve the USV and the retrieved USV can be hashed and matched with the hashed USV. Accordingly, a first tuple includes a first token and a hash of the USV, a second tuple includes a second token (distinct and unlinked from the first token) and a hash of the USV (identical to the first tuple), a third tuple includes a third tuple includes a third token (distinct and unlinked from the first and second token) and the hash of the USV, and so on. While a third party would be unable to identify the USV due to tokenization and would be unable to extract the USV from the hash of the USV, the third party is able to link and/or track the USV through all entries onto the blockchain by tracking the hash of the USV included in each tuple. Any third party (e.g., unauthorized, attacker, etc.) is able to track the USV and/or user through the similar hash in each tuple, even if a new token value is produced by the TSP in each tuple.

Referring to the figures generally, various arrangements described herein relate to systems and methods for securely storing a message that impedes the ability to track a USV through a similar hash value in a series of tokens, tuples, and/or messages. The blockchain anonymous tokenization ("BAT") system provides an automated generation of a fresh random hash from the USV to accomplish anonymity in the blockchain without disrupting the integrity of the blockchain, distributed ledger, and/or smart contract that includes the token and hash of the USV. In some arrangements, the BAT system facilitates the generation of a salt (e.g., random value) that is added to the USV to generate a salted USV and conducts a one-way hash function on the salted USV to generate a BAT hash. The salt may be appended or prepended to the USV. The BAT system may be configured to maintain an iteration count for a given USV to identify a number of iterations a salted USV has undergone to generate the BAT hash.

The BAT system may track and allow a user to select attributes of a BAT message that includes the BAT hash such as a string returned, the tokenization method used, a hash algorithm used, and other attributes. The BAT system allows for the USV to be recovered and the BAT hash used to be linked to the USV. The BAT system is configured to provide the USV to authorized users, relying parties, and/or authorized third parties to provide assurance and attestation that the token on the blockchain (or other repository) with the salted USV is the linked to the USV. The BAT system may provide the USV to a relying party under protection of a selected encryption mechanism. For example, a Transport Layer Security ("TLS") might be used, a password authentication key exchange ("PAKE") might be used after password authentication, or a biometric authenticate key exchange ("BAKE") might be used after a two factor authentication (biometric+password).

While the systems and methods of the BAT system are described as relating to a TSP, the systems and methods described herein could be implemented in a system that utilizes a key derivation function ("KDF") in a password-based encryption ("PBE") protocol. In those implementations, the iteration count would determine how many times the TSP would invoke the hash function (e.g., first instance on the USV, second on the result of the hash of the first instance, and so on) to produce a unique hash value; however, no key would result. While the systems and methods of the BAT system are described as being implemented on a blockchain, a wide variety of viewable repositories may have the BAT system implemented within. In some arrangements, the BAT system could be implemented with an application in a smart contract to prevent breach by a user altering or deleting some USV related to the USV.

The system and methods described herein allow for the confidentiality of multiple occurrences of data within an information object to be protected from unauthorized access using a managed tokenization process that also provides data integrity, origin authenticity, and/or technical non-repudiation. The systems and methods protect underlying sensitive data even when the underlying sensitive data is stored in a publicly accessible environment, such as the cloud, within a blockchain or distributed ledger in a flexible way that is file- and data-element-neutral. The generalization of the salted USV provides a "right-to-be-forgotten" service by designing its token vault so that the USV could be removed while retaining all other operational data fields. The BAT system allows for compliance with the General Data Protection Regulation ("GDPR") regarding protection and retention of private data while providing a system that "privately" links published USV value(s) that provides improvements over current tokenization and publicly accessible environments.

The BAT system allows for attestation that the tuple stored on the blockchain actually existed at some point in time, or for some time period, even after the USV was deleted. Additionally, unlike the limited, anonymous signatures supported by existing systems, this BAT system supports single signers, multiple signers, or co-signers to store information publicly without loss of confidentiality of any sensitive content.

The BAT system provides technical solutions to the computer-centric and internet-centric problems associated with conventional data management systems. For example, the BAT system, according to various arrangements, provides a more efficient and effective mechanism to the industry by providing a system that allows for flexible restriction of sensitive content that is stored on a publicly and globally accessible repository of information for periods of time that may exceed the lifetime of encryption techniques, (e.g., sufficient key lengths, trustworthy algorithms, and reliable techniques). This storage is in accordance with industry standards and allows the user to restrict access to data to those with a need to know. The BAT system provides a system and method to issue and manage tokens that prevent surveillance even when the same USV is tokenized repeatedly and/or when the same USV is encrypted using a static key. The anonymity feature accomplished by the BAT system creates one or more BAT tokens suitable for use in smart contracts and other cloud-based application environments, especially those that must comply with privacy regulations such as the GDPR right-to-be-forgotten. The BAT system supports provenance of sensitive and redacted data stored in an enterprise "data lake" and control access to this information on a need-to-know basis in a system that can be monitored and audited by an entity. In other words, the BAT system described herein provides for a system to securely store a message that impedes the ability to track a USV through a similar hash value in a series of tokens, tuples, and/or messages that provides advantages and improvements in the process of storing and protecting information in publicly accessible environments. This is accomplished, in part, through an automated generation of a fresh random hash from the USV that provides anonymity in the blockchain without disrupting the integrity of the blockchain, distributed ledger, and/or smart contract that includes the token and hash of the USV to provide assurance and attestation that the token on the blockchain (or other repository) with the salted USV is the linked to the USV. These problems arise out of the use of computers and the internet, because cloud services and online repositories cannot exist without the use of computers and the internet. Accordingly, problems relating to maintaining and protecting USV (e.g., data elements) on a shared server arise out of computers and the internet. The BAT system, including a tokenization manifest and user-interface, allows for a more effective and reliable medium for users of a multi-access repository to selectively redact, through tokenization, sensitive information. This tokenization system enables real-time restriction and detokenization of sensitive content, responsive to the authorization credentials in the tokenized document. Further, the system and process(es) implemented by the BAT system cannot be practically performed in the human mind, at least because it requires a processor accessing computer memory indicative of tokenization, hashing, and protecting associated USVs.

As described herein, the term tokenization refers to the process in which a token is substituted as a proxy for data, thus obscuring the underlying data. Accordingly, a token is a surrogate value that can be used to replace some USV. A token can appear to be very similar to the underlying data for which the token is serving as a proxy for, such that that no reconfiguration of systems is required (i.e., the token is "format preserving"). A token attribute may share a common value with the original underlying value that the token is replacing or be specific to the token itself. Alternatively, a token may include access request information. For example, the replacement string of data may include a hyperlink to the TSP provider with the ability to provide the original content. The tokens may be generated, stored, and maintained by an entity that specializes in the tokenization process. A token can be made to look very similar to the underlying data for which the token is serving as a proxy such that that no reconfiguration of systems is required (e.g., the token is "format preserving"). The mapping of underlying sensitive values to tokens does not have to be one-to-one. As in the example above, different tokens could replace the same PAN in two separate data repositories. A token attribute may share a common value with the original underlying value the token is replacing or be specific to the token itself. For example, the token may share the structure of that value (e.g., the length and character set) or a mechanism to determine that the token is actually a token (e.g., actually represents a replacement value rather than the original underlying value).

As used herein, the term "tuple" refers to a data value to be included in a block on a blockchain, a portion of a smart contract, a digital message, and/or similar data entry onto a repository. The tuple includes a token of a USV and a hash of the USV. The tuple may include a URI or similar query string that is associated with the TSP and/or tokenization schema used to generate the token. Providing the hash of the USV provides data integrity, origin authenticity, and/or non-repudiation of the tuple with respect to the USV. In other words, a relying party may use the URI to retrieve the USV associated with the generated token in the tuple and compare the retrieved USV to the hash of the USV in the tuple to confirm that they match.

Referring to FIG. 1, a block diagram of generating a tuple in a salted BAT system 100 is shown, according to an example arrangement. The salted BAT system 100 is used to generate a tuple 120 that includes a token 114 of the USV 102 and a salted hash 110 of a salted USV 106. The salted BAT system 100 is structured to salt a USV, generate a tuple 120, and store the requisite salt 104 information for subsequent verification by a relying party. The salted BAT system 100 may include a TSP to tokenize the USV 102. The tuple 120 generated by the salted BAT system 100 eliminates the ability of a third party to link tuples generated with the same USV as the hash of the USV will be different for each tuple generated using the same underlying USV 102. Further, the tuple 120 generated by the salted BAT system 100 will have at least the same level of security and protection to the underlying USV as current tokenization management and security systems.

The process of using the salted BAT system 100 begins as the salted BAT system 100 receives a USV 102. The USV 102 may be any type of content. The content may be a file of any type (e.g., an excel document, JPEG, text document, pdf file, and so on). The USV 102 may have been previously used to generate a tuple in a prior iteration.

The salted BAT system 100 retrieves a salt 104. The salt 104 may be a randomly generated string that includes letters, numbers, symbols, and other characters. The salt 104 may be a nonce. The salt 104 that is generated is stored within the salted BAT system 100 for subsequent verification with the tuple 120. In some arrangements, the salted BAT system 100 may generate a BAT message 130 that includes the salt 104 and an identifier 122 of the USV 102. In some arrangements, the BAT message 130 is cryptographically bound under a digital signature. In some arrangements, the BAT message 130 includes a hash of the tuple 120 generated and the salt 104.

The salted BAT system 100 prepends or appends the salt 104 to the USV 102 to generate the salted USV 106. The salted USV 106 will be recognizable in so far that the USV 102 will remain uninterrupted by the salt 104. The salted USV 106 is then hashed using a hashing algorithm 108 to generate the salted hash 110.

The salted BAT system 100 tokenizes the USV 102 before, after, or concurrently with the hashing 108 of the salted USV 106 to generate a token 114. The tokenization process includes tokenizing the USV 102 using a tokenization algorithm 112 to generate the token 114. In some arrangements, the salted BAT system 100 may include a hash of the token or the token in the BAT message 130 with the salt 104. In some arrangements, the salted BAT system 100 includes a TSP that is structured to receive the USV 102, tokenize the USV using a tokenization algorithm to generate the token 114, and transmit the token 114. In those arrangements, that TSP may be used to detokenize the token during a verification event. The verification event may be requested by a third-party, auditing entity, and so on, that is comparing the detokenized USV to a re-created hash of the salted USV to verify data integrity of the tuple. For example, similar to the method 500 described below in FIG. 5. In some arrangements, the TSP does not receive or know the salt 104.

The salted BAT system 100 uses the salted hash 110 and the token 114 to generate the tuple 120. The tuple 120 may include additional details or attributes. For example, the tuple 120 could include details or attributes signifying a change to the USV (e.g., change of ownership, terms, etc.). In some arrangements, the salted BAT system 100 includes a URI in the tuple 120. The URI identifies where the detokenized token (e.g., USV) is stored. The URI may include plain text content including a string of characters used to identify a source and enables interaction with representations of the resource over a network, such as but not limited to the internet of things, using specific protocols. Schemes specifying a concrete syntax and associated protocols define each URI. In some examples, the URI is a Uniform Resource Locator ("URL"). The URI would allow a relying party to retrieve the USV from the token 114 (e.g., detokenize the token 114) by providing a reference to the token 114.

In some arrangements, the BAT message 130 includes information related to a change to the USV 102. For example, the USV 102 may be a promissory note that transfers ownership from a first entity to a second entity causing the USV 102 to change such that the identified payee in the promissory note changes from the first entity to the second entity. In order to link the first USV 102 to the new, second USV 012, the BAT message 130 may include a hash of the first USV 102 along with the salt used to salt the second USV 102. The salted BAT system 100 may digitally sign the BAT message 130 to ensure the integrity and authenticity of origin for all information included therein. In some arrangements, a single BAT message 130 is generated for a given USV 102 where each instance of salting the USV 102 (e.g., generating a tuple) is wrapped over the previous instance. In other words, the BAT message 130 is a nested or encapsulated message that includes the most recent instance of salt 104 used to generate a tuple 120 wrapped over previous salt(s) 104 and the associated tuple(s) 120. The BAT message 130 is a "single" message that links the tuples 120 that include the USV 102 off the blockchain and away from unauthorized third parties.

The salted BAT system 100 will subsequently use a new salt 104—and therefore generate a new salted hash 110—when the USV 102 is to be published (e.g., posted, submitted, etc.) to the blockchain. Accordingly, a second tuple will have a different token and salted hash from the first tuple 120. By way of example, the salted BAT system 100 could be implemented to obscure the transfer of ownership of a property. The USV 102 is documentation and information related to the property (property info). The property info is salted with a salt 104 of a twenty-character number string prepended to the property info to generate the salted USV 106. The number string is stored in a BAT message 130 with a hash of the generated tuple. In some arrangements, the BAT message 130 includes the salt 104 and a hash of the USV 102. The salted USV 106 is hashed 108 to generate a salted hash 110. The property info is tokenized and the token is included with the hash 108 of prepended twenty-character number string on the property info to generate a first tuple 120.

Subsequently, the property info changes ownership such that a second tuple 120 is needed on the blockchain. A fresh random salt 104 is generated that is a twenty-character alpha string prepended to the property info to generate the salted USV 106. The alpha string is stored in a BAT message 130 with a hash of the generated second tuple 120. In some arrangements, the BAT message 130 includes the salt 104 and a hash of the USV 108. In some arrangements, the BAT message 130 is wrapped over the previous salt 104 and first tuple 120 information. The property info is tokenized, and the token 114 is included with the hash 108 of a string prepended or appended to the property info to generate a second tuple 120. In some arrangements, the string is an alpha string, a numeric string, or an alphanumeric string. In some examples, the string may have a suitable number of characters (e.g., 1, 2, 10, 20 characters). As the second tuple 120 has a different token and a different hash 108 from the first tuple 120, a third party would be unable to link the second tuple 120 and the first tuple 120.

A relying party would be able to "link" all previous tuples by accessing a tuple in the blockchain, retrieving the detokenized value and BAT message (or other storage mechanism implemented by the salted BAT system 100) that includes the salt 104, and verifying the hash 108. This process is described in greater detail below with respect to method 500 of FIG. 5.

Figure 2:
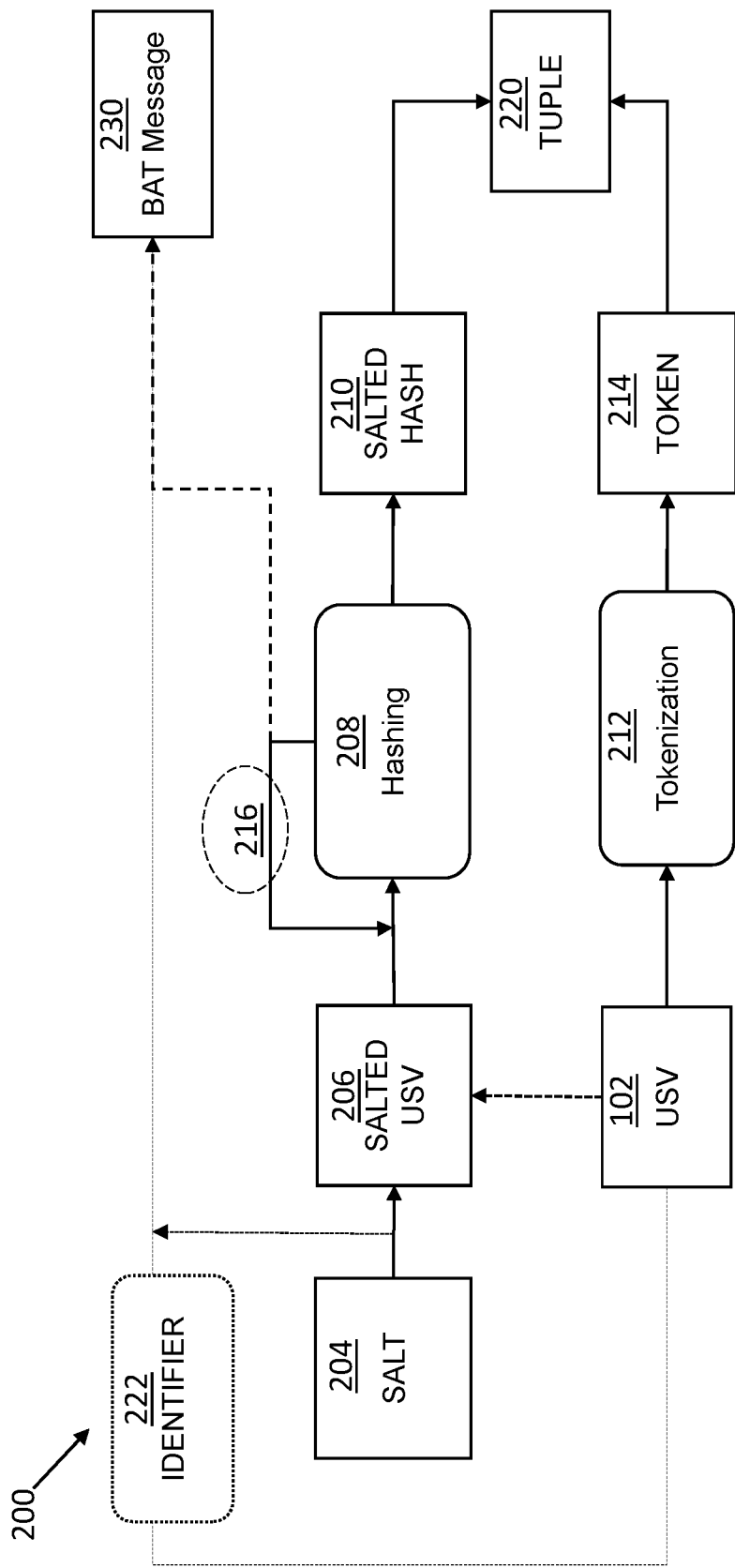
FIG. 2 is a functional block diagram generating a tuple in a blockchain anonymous tokenization system, according to another example arrangement.

Referring to FIGS. 1-2, a block diagram of generating a tuple in an iterative BAT system 200 is shown, according to an example arrangement. The iterative BAT system 200 is similar to the BAT system of FIG. 1. A difference between the iterative BAT system 200 and the salted BAT system 100, is the iterative BAT system 200 hashes a salted USV 206 more than one time (e.g., iterations). Accordingly, similar aspects of the iterative BAT system 200 and the salted BAT system 100 will have like numbering. In some arrangements, a BAT system may be structured to implement either method of the salted BAT system 100 and the iterative BAT system 200.

The iterative BAT system 200 is used to generate a tuple 220 that includes a token 214 of the USV 102 and a salted hash 210 of a salted USV 206. The iterative BAT system 200 is structured to salt a USV 120, generate a tuple 220, and store the requisite salt 204 information for subsequent verification by a relying party. The iterative BAT system 200 may include a TSP to tokenize the USV 102. The process of using the iterative BAT system 200 begins as the iterative BAT system 200 receives a USV 102. The USV 102 may be any type of content. The content may be a file of any type (e.g., an excel document, JPEG, text document, pdf file, and so on). The USV 102 may have been previously used to generate a tuple in a prior iteration.

The iterative BAT system 200 retrieves a salt 204. The salt 204 may be a randomly generated string that includes letters, numbers, symbols, and other characters. The salt 204 may be a nonce. The salt 204 that is generated is stored within the iterative BAT system 200 for subsequent verification with the tuple 220. In some arrangements, the iterative BAT system 200 may generate a BAT message 230 that includes the salt 204 and an identifier 222 of the USV 102. In some arrangements, the BAT message 230 is cryptographically bound under a digital signature. In some arrangements, the BAT message 230 includes a hash of the tuple 220 generated and the salt 204.

The iterative BAT system 200 prepends or appends the salt 204 to the USV 102 to generate the salted USV 206. The salted USV 206 will be recognizable in so far that the USV 102 will remain uninterrupted by the salt 204. The salted USV 206 is then hashed using a hashing algorithm 208 to generate a first hash. This resulting first hash is then hashed again by an iteration value 216 to generate the salted hash 210. For example, the salted USV 206 may be hashed to generate a first hash, the first hash is hashed again (using the same hashing algorithm) to generate a second hash, and the second hash is hashed again (using the same hashing algorithm) to generate the salted hash 210. In this instance the iteration value 216 would be three. The iteration value 216 is stored in the BAT message 230 along with the salt 204.

In some arrangements, the iteration value 216 is an instance of tuple generation such that a system protocol dictates the number of times the hash algorithm is looped. For example, the iteration value 216 may be "3" to indicate the third tuple generated for the USV 102, and third time the tuple is generated, the BAT system will hash-loop the USV 102 ten times. Similarly, the iteration value 216 may be "$" to indicate the sixth tuple generated for the USV 102 and sixth time the tuple is generated the BAT system will hash-loop iterate the USV 102 twenty times. This would add another layer of protection from unauthorized access, as the BAT message iteration value would not be the plaintext value of hash-loop iterations.

The iterative BAT system 200 tokenizes the USV 102 before, after, or concurrently with the hashing 208 of the salted USV 206 to generate a token 214. The tokenization proves includes tokenizing the USV 102 using a tokenization algorithm 212 to generate the token 214. In some arrangements, the iterative BAT system 200 may include a hash of the token 214 or the token 214 in the BAT message 230 with the salt 204. In some arrangements, the iterative BAT system 200 includes a TSP that is structured to receive the USV 102, tokenize the USV using a tokenization algorithm to generate the token 214, and transmit the token 214. In those arrangements, that TSP may be used to detokenize the token 214 during a verification event. In some arrangements, the TSP does not receive or know the salt 204.

The iterative BAT system 200 uses the salted hash 210 and the token 214 to generate the tuple 220. The tuple 220 may include additional details or attributes. For example, the tuple 220 could include details or attributes signifying a change to the USV 102 (e.g., change of ownership, terms, etc.). In some arrangements, the iterative BAT system 200 includes a URI in the tuple 220. The URI identifies where the detokenized token 214 (e.g., USV) is stored. The URI may include plain text content including a string of characters used to identify a source and enables interaction with representations of the resource over a network, such as the internet of things, using specific protocols. Schemes specifying a concrete syntax and associated protocols define each URI. The most common form of URI is a URL. The URI would allow a relying party to retrieve the USV 102 from the token 214 (e.g., detokenize the token 214) by providing a reference to the token 214.

In some arrangements, the BAT message 230 includes information related to a change to the USV 102. In order to link the first USV 102 to the new, second USV 102, the BAT message 230 may include a hash of the first USV 102 and iteration value 216 along with the salt 204 used to salt the second USV 102 and the second iteration value 216. The salted BAT system 100 may digitally sign the BAT message 230 to ensure the integrity and authenticity of origin for all information included therein. In some arrangements, a single BAT message 230 is generated for a given USV 102 where each instance of salting the USV 102 (e.g., generating a tuple) is wrapped over the previous instance. In other words, the BAT message 230 is a nested or encapsulated message that includes the most recent instance of salt 204 used to generate a tuple 220 wrapped over previous salt(s) 204 and the associated tuple(s) 220. The BAT message 230 is a "single" message that links the tuples that include the USV 102 off the blockchain and away from unauthorized third parties.

By way of example, the iterative BAT system 200 could be implemented to obscure an employment agreement. The USV 102 is digital/electronic documentation and information related to the employment agreement. The data corresponding to the employment agreement is salted with a salt 204 of a twenty-character number string prepended to employment agreement to generate the salted USV 206. The salted USV 106 is hashed 108 to generate a resulting hash. The resulting hash is hashed 108 an amount associated to the iteration value 216 to generate the salted hash 210. The number string and iteration value is stored in a BAT message 230 with a hash of the generated tuple 220. In some arrangements, the BAT message 230 includes the salt 204, the iteration value 216, and a hash of the USV 102. The employment agreement is tokenized, and the token 214 is included with the iteratively hashed prepended twenty-character number string on the property info to generate a first tuple 220.

Subsequently, the employment agreement is renewed (e.g., monthly) such that a second tuple is needed on the blockchain. A fresh random salt 204 is generated that is a twenty-character alpha string prepended to the property info to generate the salted USV 206. The salted USV 106 is hashed 108 to generate a resulting hash. The resulting hash is hashed 108 an amount associated to the iteration value 216 to generate the salted hash 210. The alpha string and iteration value is stored in a BAT message 230 with a hash of the generated tuple. In some arrangements, the BAT message 230 includes the salt 204, the iteration value 216, and a hash of the USV 102. The employment agreement is tokenized and the token 214 is included with the hash of prepended twenty-character alpha string on the property info to generate a second tuple 220. As the second tuple 220 has a different token 214 and a different hash from the first tuple 220, a third party would be unable to link the second tuple 220 and the first tuple 220.

A relying party would be able to "link" all previous tuples 220 by accessing a tuple 220 in the blockchain, retrieving the detokenized value and BAT message 230 (or other storage mechanism implemented by the iterative BAT system 200) that includes the salt 204 and iteration value 216, and verifying the hash. This process is described in greater detail below with respect to method 500 of FIG. 5.

Figure 3:
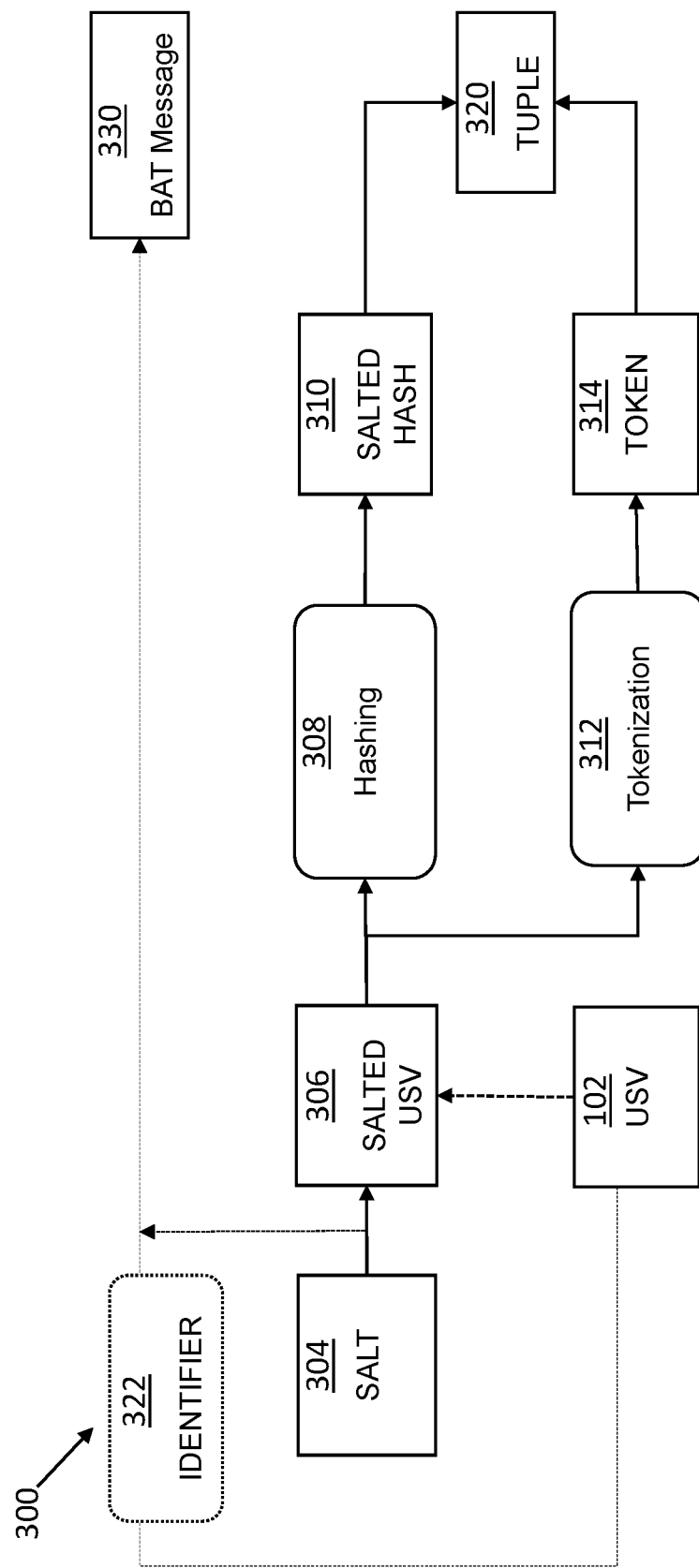
FIG. 3 is a functional block diagram generating a tuple in a blockchain anonymous tokenization system, according to a further example arrangement.

Referring to FIGS. 1-3, a block diagram of generating a tuple in a token BAT system 300 is shown, according to an example arrangement. The token BAT system 300 is similar to the salted BAT system 100 of FIG. 1. A difference between the token BAT system 300 and the salted BAT system 100, is the token BAT system 300 tokenizes the salted hash. Accordingly, similar aspects of the token BAT system 300 and the salted BAT system 100 will have like numbering. in some arrangements, the BAT system is structured to implement either method of the token BAT system 300 and the salted BAT system 100.

The token BAT system 300 is used to generate a tuple 320 that includes a token 314 of a salted USV 306 and a salted hash 310 of the salted USV 306. The token BAT system 300 is structured to salt a USV 102, generate a tuple 320, and store the requisite salt 304 information for subsequent verification by a relying party. The token BAT system 300 may include a TSP to tokenize the USV 102. The process of using the token BAT system 300 begins as the token BAT system 300 receives a USV 102. The USV 102 may be any type of content. The content may be a file of any type (e.g., an excel document, JPEG, text document, pdf file, and so on). The USV 102 may have been previously used to generate a tuple 320 in a prior iteration.

The token BAT system 300 retrieves a salt 304. The salt 304 may be a randomly generated string that includes letters, numbers, symbols, and other characters. The salt 304 may be a nonce. The salt 304 that is generated is stored within the token BAT system 300 for subsequent verification with the tuple 320. In some arrangements, the token BAT system 300 may generate a BAT message 130 that includes the salt 304 and an identifier 322 of the USV 102. In some arrangements, the BAT message 130 is cryptographically bound under a digital signature. In some arrangements, the BAT message 130 includes a hash of the tuple 320 generated and the salt 304.

The token BAT system 300 prepends or appends the salt 304 to the USV 102 to generate the salted USV 306. The salted USV 306 will be recognizable in so far that the USV 102 will remain uninterrupted by the salt 304. The salted USV 306 is then hashed using a hashing algorithm 308 to generate the salted hash 310.

The token BAT system 300 tokenizes the salted USV 306 before, after, or concurrently with the hashing 308 of the salted USV 306 to generate a token 314. Using the salted USV 306 in place of the USV 102 provides additional protection to outside entities as the USV 102 is not tokenized and the USV 102 can only be recovered by detokenizing the salted USV 102 and removing the salt 104 stored in the BAT message 330. The tokenization includes tokenizing the salted USV 306 using a tokenization algorithm 312 to generate the token 314. In some arrangements, the token BAT system 300 may include a hash of the token or the token in the BAT message 130 with the salt 304. In some arrangements, the token BAT system 300 includes a TSP that is structured to receive the salted USV 306, tokenize the salted USV 306 using a tokenization algorithm to generate the token 314, and transmit the token 314. In those arrangements, that TSP may be used to detokenize the token 314 during a verification event. In some arrangements, the TSP does not receive or know the salt 304.

The token BAT system 300 uses the salted hash 310 and the token 314 to generate the tuple 320. The tuple 320 may include additional details or attributes. For example, the tuple 320 could include details or attributes signifying a change to the USV 102 (e.g., change of ownership, terms, etc.). In some arrangements, the token BAT system 300 includes a URI in the tuple 320. The URI identifies where the detokenized token (e.g., USV) is stored. The URI may include plain text content including a string of characters used to identify a source and enables interaction with representations of the resource over a network, such as the internet of things, using specific protocols. Schemes specifying a concrete syntax and associated protocols define each URI. The most common form of URI is a URL. The URI would allow a relying party to retrieve the USV 102 from the token (e.g., detokenize the token 314) by providing a reference to the token 314.

In some arrangements, the BAT message 330 includes information related to a change to the USV 102. For example, the USV 102 may be a promissory note that transfers ownership from a first entity to a second entity causing the USV 102 to change such that the identified payee in the promissory note changes from the first entity to the second entity. In order to link the first USV 102 to the new, second USV 102, the BAT message 330 may include a hash of the first USV 102 along with the salt 304 used to salt the second USV 102. The token BAT system 300 may digitally sign the BAT message 330 to ensure the integrity and authenticity of origin for all information included therein. In some arrangements, a single BAT message 330 is generated for a given USV 102 where each instance of salting the USV (e.g., generating a tuple) is wrapped over the previous instance. In other words, the BAT message 330 is a nested or encapsulated message that includes the most recent instance of salt 304 used to generate a tuple 320 wrapped over previous salt(s) 304 and the associated tuple (s) 320. The BAT message 330 is a "single" message that links the tuples that include the USV 102 off the blockchain and away from unauthorized third parties.

The token BAT system 300 will subsequently use a new salt 304—and therefore generate a new salted hash 310— when the USV 102 is to be published (e.g., posted, submitted, etc.) to the blockchain. Accordingly, a second tuple 320 will have a different token 314 and salted hash from the first tuple 320. By way of example, the token BAT system 300 could be implemented to obscure the transfer of ownership of a property. The USV 102 is documentation and information related to the property (property info). The property info is salted with a salt 304 of a twenty-character number string prepended to the property info to generate the salted USV 306. The number string is stored in a BAT message 330 with a hash of the generated tuple 320. In some arrangements, the BAT message 330 includes the salt 304 and a hash of the USV 102. The salted USV 306 is hashed 308 to generate a salted hash 310. The property info is tokenized, and the token 314 is included with the hash of prepended twenty-character number string on the property info to generate a first tuple 320.

Subsequently, the property info changes ownership such that a second tuple is needed on the blockchain. A fresh random salt 304 is generated that is a twenty-character alpha string prepended to the property info to generate the salted USV 306. The alpha string is stored in a BAT message 330 with a hash of the generated second tuple 320. In some arrangements, the BAT message 330 includes the salt 304 and a hash of the USV 102. In some arrangements, the BAT message 330 is wrapped over the previous salt 304 and first tuple 320 information. The property info is tokenized, and the token 314 is included with the hash of prepended twenty-character alpha string on the property info to generate a second tuple 320. As the second tuple 320 has a different token 314 and a different hash from the first tuple 320, a third party would be unable to link the second tuple 320 and the first tuple 320.

A relying party would be able to "link" all previous tuples by accessing a tuple 320 in the blockchain, retrieving the detokenized value and BAT message 330 (or other storage mechanism implemented by the token BAT system 300) that includes the salt 304, and verifying the hash. This process is described in greater detail below with respect to method 500 of FIG. 5.

In some arrangements, the BAT message 130, 230, 330 may be digitally signed. Authenticity and data integrity of the BAT message 130, 230, 330 can be determined based on each of the digitally signed elements of the BAT message 130, 230, 330. Additional identifiers (e.g., OIDs) may be bound to the message 130, 230, 330, including the information related to the generated tuple. For example, an identifier could be associated with the underlying USV, the token generated, a userID, time stamp, etc. The salted BAT system 100, 200, 300 may utilize SignedData, detached SignedData, and SigncryptedData message schema, each of which provides unique functionality. Generally, the digital signature process is also referred to as "signing a message digest." The message digest includes hash values that represent the specific, digitally signed time-based digital signature messages in the time-based digital signature system. A message digest is assigned to particular data content such that a change to any of the content within a time-based digital signature message will be reflected in the message digest. In some arrangements, the message digest includes a direct signature that does not first hash the information to be protected before signing the content. In some arrangements, a signature key that includes a set of private data elements specific to an entity and usable only by this entity in the signature process may be used for the digital signature process. Under the CMS message type SignedData, there may be more than one message signer, each using a different public-private key pair and signature algorithm.

Referring generally to the use of the SignedData schema with an iterative hash (e.g., iterative BAT system 200 of FIG. 2), a SignedData message is generated at each block in the BAT message 130, 230, 330 encapsulation. Each successive block in the processing chain wraps another SignedData message around the previous message, and additional attributes can be added to the SignedData messages added to the associated BAT message 130, 230, 330 and/or tuple 120, 220, 320. Using the detached SignedData schema, a hash of the BAT message 130, 230, 330 is signed at each block in the processing chain and is transmitted out-of-band. Confidentiality is maintained throughout the process as the actual processing message content is not present. With SignedData or detached SignedData, each financial institution can perform recursive descent at each step in the BAT message 130, 230, 330 encapsulation to validate the integrity of each layer of the BAT message 130, 230, 330 at each block.

The salted BAT system 100, 200, 300 may be used to verify digital signatures in connection with secure communications, funds transfers, e-commerce transactions, or other digitally signed messages (e.g., cloud-based, blockchain-based, distributed ledgers, or smart contract systems) and to provided third-party anonymity, but accessible linkage to postings on a blockchain. The systems and methods address the requirement to protect data for long term retention even when the underlying sensitive data is stored in a publicly accessible environment, such as the cloud or within a blockchain, distributed ledger, and/or smart contracts, in a flexible way that is file and data-element neutral. In some arrangements, to provide integrity, authentication, and/or non-repudiation, the BAT messages 130, 230, 330 are bound by a TST and/or digitally signed by the time-salted BAT system 100, 200, 300.

Figure 4:
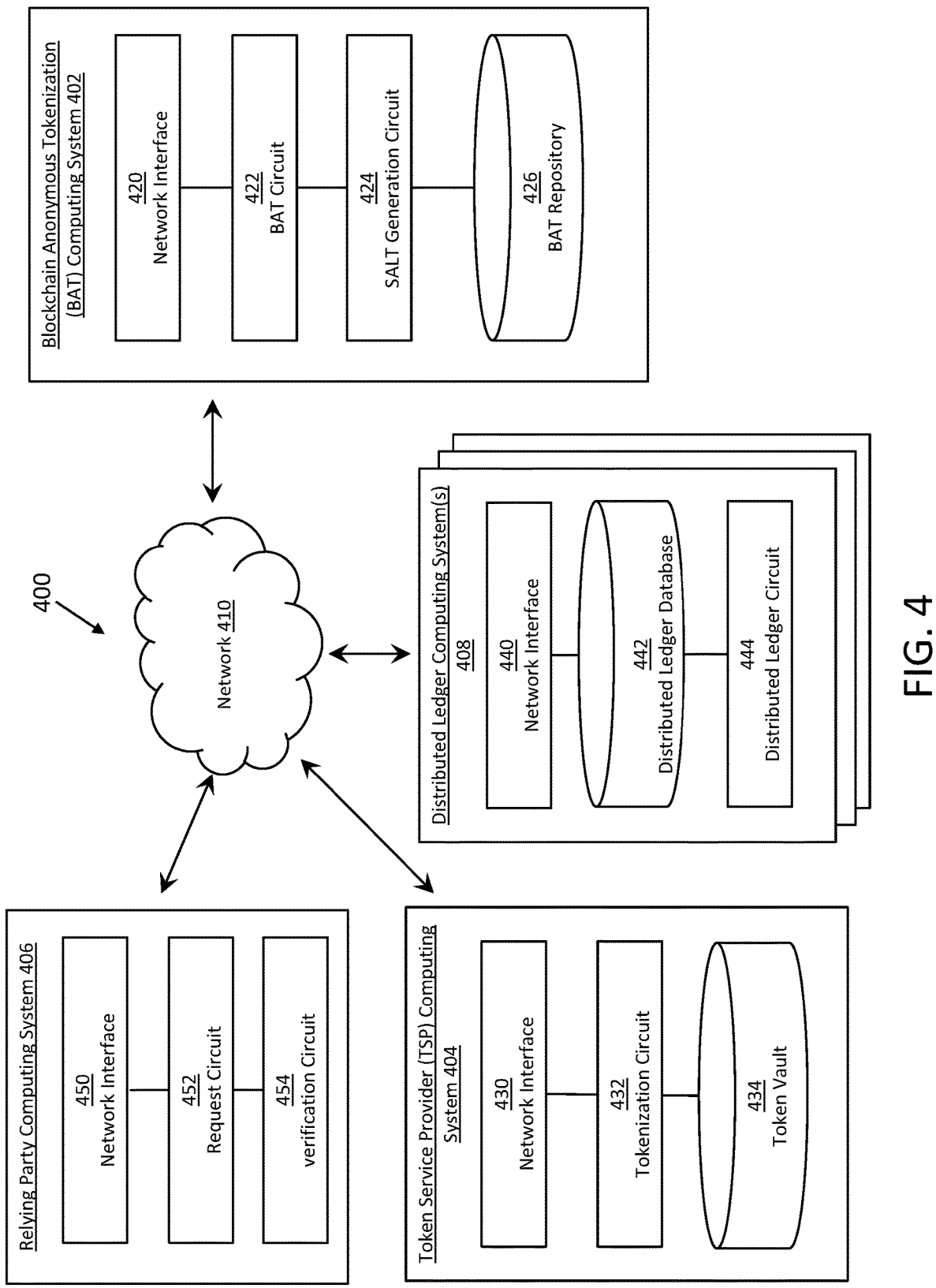
FIG. 4 is a schematic diagram of a blockchain anonymous tokenization system, according to an example arrangement.

FIG. 4 is a schematic diagram of a BAT system 400, according to an example arrangement. Referring to FIGS. 1-4, the BAT system 400 includes a BAT computing system 402, a TSP computing system 404, a relying party computing system 406, and a distributed ledger 408. Each of the BAT computing system 402, the TSP computing system 404, the relying party computing system 406, and the distributed ledger 408 are in operative communication with the others via a network 410. According to various arrangements, the BAT system 400 may be utilized to implement the generation method of the salted BAT system 100 of FIG. 1, iterative BAT system 200 of FIG. 2, the token BAT system 300 of FIG. 3, and the verification method 500 of FIG. 5. While the TSP computing system 404 and the BAT computing system 402 are shown as separate entities in FIG. 4, in some arrangements the BAT computing system 402 performs some of or all of the functions of the TSP computing system 404, as described herein. In some arrangements, one or both of the BAT computing system 402 and the TSP computing system 404 are managed and operated by a financial institution. However, in other arrangements, one or both of the BAT computing system 402 and the TSP computing system 404 are managed and operated by a third-party that is external to a financial institution.

The BAT computing system 402 includes a network interface circuit 420, a BAT circuit 422, a salt generation circuit 424, and a BAT repository 426. The network interface circuit 420 is structured to facilitate operative communication between the BAT computing system 402 and other systems and devices over the network 410. The BAT circuit 422 is configured to receive a USV and prepare a tuple and BAT message (or other storage of the salt information). The BAT circuit 422 may be structured to carry out the generation method of the salted BAT system 100 of FIG. 1, iterative BAT system 200 of FIG. 2, and the token BAT system 300 of FIG. 3. The BAT circuit 422 may communicate with the TSP computing system 404 to transmit the USV (or salted USV) for tokenization and receive a token. The BAT circuit 422 is in communication with the salt generation circuit 424 to retrieve a salt. The BAT circuit stores the used salt and hashing information in the BAT repository 426. In some arrangements, the BAT circuit 420 generates a BAT message that includes the salt and a hash of the tuple or other attribute associated with the tuple generated. In those arrangements, the BAT message may be stored in the BAT repository 426.

The TSP computing system 404 includes a network interface circuit 430, a tokenization circuit 432, and a token vault 434. The network interface circuit 430 is structured to facilitate operative communication between the TSP computing system 404 and other systems and devices over the network 410. As will be appreciated, the term token refers generally to the tokenized data. The TSP computing system 404 may, for example, include one or more servers each with one or more processors configured to execute instructions stored in a memory, send and receive data stored in the memory, and perform other operations to implement the services described herein associated with the processing modules, databases, and processes. In some arrangements, some or all of the functions of the TSP computing system 404 are managed by the TSP computing system 402.

The network interface circuit 430 is structured to facilitate operative communication between the TSP computing system 404 and other systems and devices over the network 410.

The tokenization circuit 432 is structured to organize and facilitate the tokenization (e.g., replacing cleartext with a token) of any biometric sample data received. This includes tokenizing and detokenizing the USV 102. In some arrangements, the tokenization circuit 432 may provide an OID with the tokenized USV returned to the BAT computing system 402 for inclusion in the tuple. For example, the OID could represent a TSP identifier, tokenization schema, or other information to assist the TSP computing system 406 in processing a tokenization or detokenization request from the BAT computing system 402 and/or a detokenization request from the relying party computing system 406. In some arrangements, the BAT computing system 402 may transmit a detokenization request with the token to the TSP computing system 406. In some arrangements, the tokenization circuit 432 may examine an OID (e.g., either as a signed attribute or included in the BAT message) with the received token.

The token vault 434 is structured to store the tokenization schemas that the TSP has implemented to tokenize data to facilitate the detokenization of the tokenized data. In some arrangements, the token vault 434 includes the plaintext data associated with the generated tokens. The token vault 434 contains information related to the generation of the tokens (e.g., the requesting entity, encryption algorithms used, the original content, processing information, etc.). Once a relying party computing system 406 is authorized to access one or more tokens, the token vault 434 supplies the information for the authorized USV. In some arrangements, the token vault 434 stores any authentication information associated with the token, for example, a plurality of user names and passwords that are allowed to access the tokenized redacted content. In other arrangements, the access information is stored in an accounts database. The accounts database may store the access control information for the plurality of tokens generated and stored in the tokens vault 434. For example, a requesting entity may have a single password with the TSP that allows the requesting entity to detokenize any data to which the requesting entity has access.

The relying party computing system 406 includes a network interface circuit 450, a request circuit 452, and a verification circuit 454. The network interface circuit 450 is structured to facilitate operative communication between the relying party computing system 406 and other systems and devices over the network 410. The relying party computing system 406 may use the network interface circuit 450 to retrieve a tuple on the one or more distributed ledger computing systems 408 over the network 410. Once the tuple is retrieved, the request circuit 452 identifies the URI, or similar access information, stored within the tuple and requests for the token to be detokenized and for the salt. The request circuit 452 may be configured to provide authentication information necessary to detokenize the token from the TSP computing system 404 and/or access the salt from the BAT computing system 402. This may require submitting the token to the TSP computing system 404 and the tuple, token, or other identifying information to the BAT computing system 402 to retrieve the properly associated salt.

Once the detokenized token (e.g., USV) and the salt are retrieved, the verification circuit 454 appends the salt to the USV and hashes the resulting salt and USV to generate a verification salted hash. The verification salted hash is compared to the salted hash in the tuple. If the verification salted hash matches the salted hash, the USV and tuple are validated. Subsequent tuples may be retrieved from the one or more distributed ledger computing systems 408 and verified to "link" the tuples that include the same USV.

The one or more distributed ledger computing systems 408 are associated with the distributed ledger for which the BAT computing system 402 stores generated tuples. For example, the one or more distributed ledger computing systems 408 may be or include a central computer network storing the distributed ledger, computer nodes verifying transactions posted to the distributed ledger, computer nodes posting transactions to the distributed ledger, and so on. In various arrangements, the distributed ledger may be a permissionless or a permissioned ledger. If permissionless, the one or more distributed ledger computing systems 408 may include any computing system capable of downloading transactions posted to, verifying transactions posted to, and/or posting transactions to the distributed ledger. If permissioned, the one or more computing systems 408 may be associated with one or more trusted entities given access to the distributed ledger for the purposes of posting transactions and verifying transactions posted to the distributed ledger. In some arrangements, the distributed ledger computing system 408 may further be a single computing system, for example, trusted to verify and maintain a distributed ledger.

The one or more distributed ledger computing systems 408 each include at least a network interface circuit 440, a distributed ledger database 442, and a distributed ledger circuit 444. The network interface circuit 440 is adapted for and configured to establish a communication session via the network 410 with other components of the BAT system 400. As used herein, a "network interface" may include any of a cellular transceiver (Code Division Multiple Access ("CDMA"), Global System for Mobile Communications ("GSM"), Long-Term Evolution ("LTE"), etc.), a wireless network transceiver (e.g., 802.11X, ZigBee, Bluetooth, etc.), and a combination thereof (e.g., both a cellular transceiver and a Bluetooth transceiver). The distributed ledger circuit 444 is configured to retrievably store information relating to the distributed ledger from the distributed ledger database 442. Accordingly, the distributed ledger database 442 may store the entirety or part of a distributed ledger, for example, downloaded from a central computing system or from other distributed ledger computing systems 408. It should be understood, however, that in some arrangements, the one or more distributed ledger computing systems 408 may include components in addition to the network interface circuit 440 and the distributed ledger database 442. As an illustration, a given distributed ledger computing system 102 may include an input/output circuit, a display, etc.

Referring to FIGS. 1-5, a flow diagram of a method 500 of verifying a tuple is illustrated, according to an example arrangement. The method 500 is shown in connection with a BAT computing system 402, the TSP computing system 404, and the relying party computing system 406. The method 500 could be performed by an external third party (e.g., an entity that manages the relying party computing system 406 of FIG. 4). Additionally, the method 500 may be similarly performed by other systems and devices.

The method 500 begins at 502 with the relying party computing system 406 identifying a tuple in the distributed ledger and requesting the salt. The relying party computing system 406 may identify the entity associated with the salt through a URI or other attribute within the tuple. The relying party computing system 406 may need to transmit authentication information to the BAT computing system 402 to retrieve the salt.

At 504, the request is received by the BAT computing system 402 and the associated salt is identified. The BAT computing system 402 may use the URI, the tuple, a user identifier associated with the relying party computing system 406, authentication information, or other data to identify the salt associated with the tuple. In some arrangements, the USV is retrieved by detokenizing the token in tuple. In other arrangements, the tuple includes a BAT message identifier, such that the BAT computing system 402 retrieves the salt and USV used to generated the tuple and re-hashes the salt and USV to compare to the salted hash in the tuple. In some arrangements, the tuple includes a USV identifier, such that the BAT computing system 402 retrieves the salt and USV used to generated the tuple and re-hashes the salt and USV to compare to the salted hash in the tuple. At 506, the BAT computing system 402 transmits the salt to the relying party computing system 406. The transmission may be an encrypted transmission.

At 508, the relying party computing system 406 receives the salt from the BAT computing system 402. At 510, the relying party computing system 406 identifies the entity associated with the token through a URI or other attribute within the tuple and transmits a detokenization request. The relying party computing system 406 may need to transmit authentication information to the TSP computing system 404 to detokenize the token. In some arrangements, the steps of the relying party computing system 406 are accomplished by the BAT computing system 402.

At 512, the token is detokenized to retrieve the USV. The TSP computing system 404 detokenizes the token according to the associated tokenization schema used to previously tokenize the USV. At 514, the TSP computing system 404 transmits the plaintext USV to the relying party computing system. In some arrangements, the steps of the relying party computing system 406 are accomplished by the BAT computing system 402.

At 516, the relying party computing system 406 verifies the tuple and USV. The relying party computing system 406 salts the USV retrieved from the TSP computing system 404 at 514 with the salt retrieved from the BAT computing system 402 at 506. The relying party computing system 406 hashes the salted hash according to the hashing algorithm to generate a verification salted hash. In some arrangements, the hashing algorithm is provided by the BAT computing system 402. In other arrangements, the hashing algorithm is provided in the tuple. In some arrangements, the hashing algorithm is repeated according to an iteration value in the salt information received from the BAT computing system 402 at 506. The verification salted hash is compared to the salted hash in the tuple. If they match, the tuple is validated and subsequent tuples may be retrieved and verified to be associated with the same USV, allowing the relying party to link the tuples in the distributed ledger. In some arrangements, the blocks of the relying party computing system 406 are accomplished by the BAT computing system 402.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus; for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed:

1. A method, comprising:
   hashing, by a computing system, a first salted value to generate a first hashed salted value, the first salted value comprising a first salt value and a value;
   generating, by the computing system, a first tuple, the first tuple comprising the first hashed salted value and a first token, the first token associated with the value; and
   generating, by the computing system, a first blockchain anonymous tokenization message, the first blockchain anonymous tokenization message comprising the first salt value, wherein the first blockchain anonymous tokenization message is associated with the first tuple, wherein the first blockchain anonymous tokenization message provides third party anonymity and is accessible through a first linkage posted on a blockchain,
   wherein verification of data integrity of the first tuple is determined by retrieving the first salt value in the first blockchain anonymous tokenization message and detokenizing the first token to retrieve a detokenized value.

2. The method of claim 1 further comprising:
   hashing, by the computing system, a second salted value to generate a second hashed salted value, the second salted value comprising a second salt value and the value;
   generating, by the computing system, a second tuple, the second tuple comprising the second hashed salted value and a second token, the second token associated with the value; and
   generating, by the computing system, a second blockchain anonymous tokenization message, the second blockchain anonymous tokenization message comprising the second salt value, wherein the second blockchain anonymous tokenization message is associated with the second tuple, wherein the second blockchain anonymous tokenization message provides third-party anonymity and is accessible through a second linkage posted on the blockchain.

3. The method of claim 2, wherein at least one of the first tuple and the first blockchain anonymous tokenization message further comprises at least one of a first blockchain anonymous tokenization message identifier and a first tuple identifier, wherein at least one of the first blockchain anonymous tokenization message identifier and the first tuple identifier is used to identify the first blockchain anonymous tokenization message when the first tuple is received by the computing system, and wherein at least one of the second tuple and the second blockchain anonymous tokenization message further comprises at least one at least one of a second blockchain anonymous tokenization message identifier and a second tuple identifier, wherein the at least one of the second blockchain anonymous tokenization message identifier and the second tuple identifier is used to identify the second blockchain anonymous tokenization message when the second tuple is received by the computing system.

4. The method of claim 2, wherein the second blockchain anonymous tokenization message further comprises the first blockchain anonymous tokenization message to generate an encapsulated blockchain anonymous tokenization message.

5. The method of claim 1, wherein the first blockchain anonymous tokenization message further comprises a value identifier, the value identifier associated with the value, and wherein the verification of data integrity of the first tuple can be determined by retrieving the first blockchain anonymous tokenization message and the verification of data integrity may be validated by comparing a hash generated with the first salt value in the first blockchain anonymous tokenization message and the value associated with the value identifier in the first blockchain anonymous tokenization message to the first hashed salted value of the first tuple.

6. The method of claim 1, wherein the first hashed salted value is generated by hashing the first salted value to generate a first temporary hash and hashing the first temporary hash a set number of times to generate the first hashed salted value, wherein the first blockchain anonymous tokenization message further comprises the set number of times.

7. The method of claim 1, the first blockchain anonymous tokenization message further comprises a value identifier, the value identifier associated with the value, and wherein the first blockchain anonymous tokenization message is digitally signed with a private key to generate a digitally signed first blockchain anonymous tokenization message, wherein authenticity and data integrity of the first blockchain anonymous tokenization message can be determined by retrieving the digitally signed hash of the first salt value and the value identifier and based on each of the digitally signed first salt value, the value identifier, and a public key of a public/private key pair including the private key.

8. A system comprising:
a repository comprising a plurality of blockchain anonymous tokenization messages;
a server system, the server system comprising a processor and instructions stored in non-transitory machine-readable media, the instructions configured to cause the server system to:
hash a first salted value to generate a first hashed salted value, the first salted value comprising a first salt value and a value;
generate a first tuple, the first tuple comprising the first hashed salted value and a first token, the first token associated with the first salted value; and
generate a first blockchain anonymous tokenization message, the first blockchain anonymous tokenization message comprising the first salt value, wherein the first blockchain anonymous tokenization message is associated with the first tuple,
wherein the first blockchain anonymous tokenization message provides third-party anonymity and is accessible through a first linkage posted on a blockchain,
wherein verification of data integrity of the first tuple is determined by retrieving the first salt value in the first blockchain anonymous tokenization message and detokenizing the first token to retrieve a detokenized value.

9. The system of claim 8, wherein the instructions are further configured to cause the server system to:
hash a second salted value to generate a second hashed salted value, the second salted value comprising a second salt value and the value;
generate a second tuple, the second tuple comprising the second hashed salted value and a second token, the second token associated with the second salted value; and
generate a second blockchain anonymous tokenization message, the second blockchain anonymous tokenization message comprising second first salt value, wherein the second blockchain anonymous tokenization message is associated with the second tuple,
wherein the second blockchain anonymous tokenization message provides third-party anonymity and is accessible through a second linkage posted on the blockchain.

10. The system of claim 9, wherein at least one of the first tuple and the first blockchain anonymous tokenization message further comprises at least one of a first blockchain anonymous tokenization message identifier and a first tuple identifier, wherein at least one of the first blockchain anonymous tokenization message identifier and the first tuple identifier is used to identify the first blockchain anonymous tokenization message when the first tuple is received by the server system, and wherein at least one of the second tuple and the second blockchain anonymous tokenization message further comprises at least one at least one of a second blockchain anonymous tokenization message identifier and a second tuple identifier, wherein the at least one of the second blockchain anonymous tokenization message identifier and the second tuple identifier is used to identify the second blockchain anonymous tokenization message when the second tuple is received by the server system.

11. The system of claim 10, wherein the first blockchain anonymous tokenization message further comprises a value identifier, the value identifier associated with the value, and wherein the verification of data integrity of the first tuple is determined by retrieving the first salt value in the first blockchain anonymous tokenization message and the value associated with the value identifier and detokenizing the first token to retrieve a detokenized salted value, wherein the first tuple is validated by comparing the first salt value and the value to the detokenized salted value.

12. The system of claim 10, wherein the second blockchain anonymous tokenization message further comprises the first blockchain anonymous tokenization message to generate an encapsulated blockchain anonymous tokenization message, wherein the encapsulated blockchain anonymous tokenization message include the second salt value, the first salt value nested, and a value identifier, the value identifier associated with the value, and wherein each subsequent generated blockchain anonymous tokenization message for the value is wrapped over previous blockchain anonymous tokenization messages in the encapsulated blockchain anonymous tokenization message.

13. The system of claim 8, wherein the first blockchain anonymous tokenization message further comprises a value identifier, the value identifier associated with the value, and wherein the verification of data integrity of the first tuple can be determined by retrieving the first blockchain anonymous tokenization message and the verification of data integrity may be validated by comparing a hash generated with the first salt value in the first blockchain anonymous tokenization message and the value associated with the value identifier in the first blockchain anonymous tokenization message to the first hashed salted value of the first tuple.

14. The system of claim 8, wherein the first hashed salted value is generated by hashing the first salted value to generate a first temporary hash and hashing the first temporary hash a set number of times to generate the first hashed salted value, wherein the first blockchain anonymization message further comprises the set number of times.

15. The system of claim 8, wherein the first blockchain anonymous tokenization message further comprises a value identifier, the value identifier associated with the value, and wherein the first blockchain anonymous tokenization message is digitally signed with a private key to generate a digitally signed first blockchain anonymous tokenization message, wherein authenticity and data integrity of the first blockchain anonymous tokenization message can be determined by retrieving the digitally signed hash of the first salt value and the value identifier and based on each of the digitally signed first salt value, the value identifier, and a public key of a public/private key pair including the private key.

16. A method, comprising:
  receiving, by a computing system, a first tuple, the first tuple comprising a first hashed salted value and a first token, the first hashed salted value generated by hashing a first salted value, the first salted value generated by combining a first salt value and a value, the first token generated by tokenizing the value;
  identifying, by the computing system, a first blockchain anonymous tokenization message associated with the first tuple, the first blockchain anonymous tokenization message comprising the first salt value and a value identifier, the value identifier associated with the value, wherein the first blockchain anonymous tokenization message provides third-party anonymity and is accessible through a first linkage posted on a blockchain;
  retrieving, by the computing system, the value associated with the value identifier;
  combining, by the computing system, the retrieved value and the first salt value of the first blockchain anonymous tokenization message to generate a match salted value;
  hashing, by the computing system, the match salted value to generate a hashed match salted value; and
  comparing, by the computing system, the first hashed salted value of the first tuple to the hashed match salted value to verify data integrity of the first tuple,
  wherein verification of data integrity of the first tuple is determined by retrieving the first salt value in the first blockchain anonymous tokenization message and detokenizing the first token to retrieve a detokenized value.

17. The method of claim 16, further comprising:
  identifying, by the computing system, a second blockchain anonymous tokenization message using the value identifier of the first blockchain anonymous tokenization message, the second blockchain anonymous tokenization message comprising a second salt value and the value identifier, wherein the second blockchain anonymous tokenization message provides third-party anonymity and is accessible through a second linkage posted on the blockchain; and
  identifying, by the computing system, a second tuple using the second blockchain anonymous tokenization message.

18. The method of claim 17, wherein the second blockchain anonymous tokenization message further comprises the value identifier and wherein the verification of data integrity of the second tuple can be determined by comparing a hash generated with the second salt value in the second blockchain anonymous tokenization message and the value associated with the value identifier in the second blockchain anonymous tokenization message to a second hashed salted value of the second tuple.

19. The method of claim 16, wherein the first blockchain anonymous tokenization message is digitally signed with a private key to generate a digitally signed first blockchain anonymous tokenization message, wherein authenticity and data integrity of the first blockchain anonymous tokenization message can be determined by retrieving the digitally signed hash of the first salt value and the value identifier and based on each of the digitally signed first salt value, the value identifier, and a public key of a public/private key pair including the private key.

20. The method of claim 16, wherein the first tuple is associated with a second tuple, the second tuple comprising a second hashed salted value and a second token, the second hashed salted value generated by hashing a second salted value, the second salted value generated by combining a second salt value and the value and the second token generated by tokenizing the value.

* * * * *